US012800465B2

(12) United States Patent
Agache

(10) Patent No.: US 12,800,465 B2
(45) Date of Patent: Nov. 17, 2026

(54) SYSTEM AND METHOD FOR MEASURING AT LEAST ONE PROPERTY OF A PARTICLE USING A MECHANICALLY COUPLED MECHANICAL RESONATOR AND GRAVIMETRIC SENSOR

(71) Applicant: Commissariat A L'Energie Atomique et aux Energies Alternatives, Paris (FR)

(72) Inventor: Vincent Agache, Grenoble cedex (FR)

(73) Assignee: Commissariat A L'Energie Atomique et aux Energies Alternatives, Paris (FR)

( * ) Notice: Subject to any disclaimer, the term of this patent is extended or adjusted under 35 U.S.C. 154(b) by 325 days.

(21) Appl. No.: 18/746,125

(22) Filed: Jun. 18, 2024

(65) Prior Publication Data

US 2024/0418624 A1 Dec. 19, 2024

(30) Foreign Application Priority Data

Jun. 19, 2023 (FR) ....................................... 2306255

(51) Int. Cl.
*G01N 15/10* (2024.01)

(52) U.S. Cl.
CPC .................................... *G01N 15/10* (2013.01)

(58) Field of Classification Search
CPC .... G01N 15/10; G01N 5/00; G01N 2009/006; G01N 2291/0256; G01N 9/002; G01N 29/022; G01N 29/036; G01N 29/222
See application file for complete search history.

(56) References Cited

U.S. PATENT DOCUMENTS

| | | | | |
|---|---|---|---|---|
| 8,899,102 | B2 * | 12/2014 | Manalis | G01N 15/12 73/32 A |
| 2010/0154535 | A1 * | 6/2010 | Manalis | G01N 15/1023 73/32 R |
| 2013/0263658 | A1 | 10/2013 | Manalis et al. | |
| 2014/0096604 | A1 | 4/2014 | Manalis et al. | |
| 2021/0046477 | A1 * | 2/2021 | Manalis | B01L 3/502761 |

OTHER PUBLICATIONS

Preliminary French Search Report issued Feb. 5, 2024 in French Application 2306255 filed on Jun. 19, 2023, 9 pages (with English Translation of Categories of Cited Documents & Written Opinion).
De Pastina et al., "Suspended micro/nano channel resonators: a review", Journal of Micromechanics and Microengineering, 2020, 18 pages.

* cited by examiner

*Primary Examiner* — Tarun Sinha
(74) *Attorney, Agent, or Firm* — Oblon, McClelland, Maier & Neustadt, L.L.P.

(57) ABSTRACT

A system for measuring at least one property of a particle (P), including a mechanical resonator including at least a first fixed part and a first suspended part able to vibrate with respect to the first fixed part, and a fluidic circuit integrated into its suspended part, in which a fluid containing the particle (P) is made to circulate, an excitation device configured to make the first suspended part vibrate at an excitation frequency (F_smr), a first gravimetric sensor including at least a second fixed part and a second suspended part able to vibrate with respect to the second fixed part, the first suspended part of the mechanical resonator and the second suspended part of the first gravimetric sensor being coupled mechanically to one another via a mechanical linking element.

14 Claims, 11 Drawing Sheets

SYSTEM AND METHOD FOR MEASURING AT LEAST ONE PROPERTY OF A PARTICLE USING A MECHANICALLY COUPLED MECHANICAL RESONATOR AND GRAVIMETRIC SENSOR

TECHNICAL FIELD OF THE INVENTION

The present invention relates to a system and a method for measuring at least one property of a particle using a mechanically coupled mechanical resonator with an integrated fluidic channel and gravimetric sensor.

PRIOR ART

To detect the presence of biomarkers of interest such as proteins, exosomes, circulating RNA, circulating DNA, viruses or larger target species such as bacteria and cells, it is known to use biosensors.

Biosensors include in particular the category of gravimetric sensors. These are based on the use of a mechanical oscillator or resonator, equipped with a suspended part that is set in vibration at its resonant frequency. Any target that grafts to the surface of the suspended part of the resonator causes the mass thereof to increase, thereby reducing its resonant frequency by a shift proportional to the mass of the captured target.

By continuously measuring the fluctuations in resonant frequency, it is then possible to work out the mass adsorbed on the resonator in real time and for example to thus monitor adsorption kinetics with targets.

One solution proposed in the prior art consists in integrating and defining a fluidic channel inside the suspended part of the resonator, while said resonator oscillates in a fluid-free cavity. The advantage then lies in a quality factor that is altered very little, even in the presence of fluid circulating in the oscillator, and thus an optimized detection limit. This type of resonator is commonly called an SMR (suspended microchannel resonator) or else an SNR (suspended nanochannel resonator), depending on the dimensions of its fluidic channel. It may be noted that a resonator equipped with a fluidic channel the width or thickness of which is less than 1 μm will be referenced as an SNR, otherwise it will be an SMR.

By virtue of a pressure gradient imposed between a fluidic inlet and a fluidic outlet of the circuit, it is possible to control the flow of the fluid (its flow rate and flow direction), and therefore the passage of suspended particles through the SMR (or SNR). This type of sensor has been used for various applications, including the individual weighing of biological particles such as cells, bacteria, nanoparticles or even the detection of specific proteins through the prior functionalization of the internal walls of the SMR. This operating principle is now well known. Patent application US2021/046477A1 and U.S. Pat. Nos. 8,899,102B1, 8,631,685B2 and 8,312,763B2 describe this type of sensor.

Documents US2021/046477A1 and U.S. Pat. No. 8,899,102B2, for their part, describe conventional SMR solutions.

Although the solution using an SNR resonator has an improved detection limit compared to that using an SMR resonator, it has certain limits:

- The dimensions of the suspended part of the SNR result in limitations in terms of the size of its fluidic channel, and therefore in terms of the size of the particles able to be injected and analysed therein.
- These dimensional constraints may mean that the sample to be analysed has to be prepared beforehand, so that the particles are able to circulate freely in the fluidic channel of the SNR resonator without the risk of this becoming clogged due to the presence of particles larger than its fluidic cross section; in other words, the resonator is not necessarily suitable for analysing complex samples (such as blood for example, because this contains both cells and proteins, covering a dynamic range in terms of size ranging from nanometres to several micrometres for cells typically with a diameter of 10 to 15 μm).

There is therefore a need to have a solution that makes it possible both to release the dimensional constraints of the fluidic circuit of an SNR resonator and to achieve a detection limit at least equivalent to that of an SNR resonator.

DESCRIPTION OF THE INVENTION

This aim is achieved by a system for measuring at least one property of a particle, comprising:

- A mechanical resonator comprising at least a first fixed part and a first suspended part able to vibrate with respect to the first fixed part, and a fluidic circuit integrated into its suspended part, in which a fluid containing said particle is made to circulate,
- Excitation means configured to make the first suspended part vibrate at an excitation frequency,
- A first gravimetric sensor comprising at least a second fixed part and a second suspended part able to vibrate with respect to the second fixed part at a vibration frequency,
- The first suspended part of the mechanical resonator and the second suspended part of the first gravimetric sensor being coupled mechanically to one another via a mechanical linking element,
- Measuring means for measuring variations in the vibration frequency of the second suspended part of the first gravimetric sensor.

Advantageously, the excitation frequency corresponds to the resonant frequency of the resonator or that of a higher natural mode of this resonant frequency.

According to one advantageous embodiment, the mechanical linking element comprises a first end integral with the first suspended part on a first point corresponding to a vibration anti-node of the first suspended part, when the latter is excited at its resonant frequency or at that of a higher natural mode.

According to one advantageous embodiment, the mechanical linking element comprises a second end integral with the second suspended part on a second point corresponding to a vibration anti-node of the second suspended part, when the latter is excited at the vibration frequency.

According to one particular embodiment, the first suspended part is chosen from among a beam clamped to a single fixed part, a beam clamped between two fixed parts, and a plate held between multiple fixed parts.

According to one particular embodiment, the second suspended part is chosen from among a beam clamped to a single fixed part, a beam clamped between two fixed parts, and a plate held between multiple fixed parts.

According to one particular feature, the excitation means are configured to make the second suspended part vibrate at a vibration frequency close to the resonant frequency of the first suspended part or at that of a higher natural mode, at plus or minus 30% of said resonant frequency or that of the higher natural mode.

According to one particular feature, the excitation means comprise at least one piezoceramic element.

According to another particular feature, the measuring means comprise one or more piezoresistive gauges.

According to another particular feature, the fluidic circuit integrated into the first suspended part of the mechanical resonator comprises a main fluidic channel and a hydrodynamic trap positioned in its channel and intended to trap said particle.

According to another particular embodiment, the system comprises:

A second gravimetric sensor, comprising at least a third fixed part and a third suspended part able to vibrate with respect to the third fixed part at a second vibration frequency, The first suspended part of the mechanical resonator and the third suspended part of the second gravimetric sensor being coupled mechanically to one another via a second mechanical linking element, Second measuring means for measuring variations in the second vibration frequency of the third suspended part of the second gravimetric sensor.

According to one particular feature, the third suspended part is chosen from among a beam clamped to a single fixed part, a beam clamped between two fixed parts, and a plate held between multiple fixed parts.

The invention also relates to a method for measuring at least one property of a particle, implemented using a measuring system as defined above, the method comprising the following steps:

Injecting a fluid containing said particle into the fluidic circuit of the mechanical resonator, Exciting the first suspended part of the mechanical resonator at its resonant frequency, Exciting the second suspended part of the first gravimetric sensor at the vibration frequency, Measuring variations in the vibration frequency of the second suspended part of the first gravimetric sensor.

According to one particular feature, the method comprises a step of calibrating the system by injecting a fluid containing one or more calibrated particles into the fluidic circuit.

The principle of the invention is thus based overall on the mechanical coupling of an oscillating structure with an embedded fluidic channel (that is to say an SMR) to a solid oscillator (without a fluidic channel) that is much smaller (and which will be called NEMS for nanoelectromechanical system, or otherwise MEMS for microelectromechanical system, depending on the dimensions), and which is used to measure frequency fluctuations following the passage of particles or targets circulating through the fluidic channel.

In the context of the invention, it is thus possible to exploit the small dimensions of the gravimetric sensor (that is to say the NEMS or MEMS), by minimizing its effective mass (proportional to its volume, to the density of the material of which it consists, and which is also dependent on the resonance mode). It is possible to obtain a detection limit that is optimized compared to that of the mechanical resonator including the fluidic channel (that is to say the SMR).

At the same time, the micrometric dimensions of the fluidic channel integrated into an SMR resonator make it possible to make micrometre-size targets or particles (typically with a diameter of 10 to 15 μm or more for cells) circulate therein, as well as more complex fluids than in the case of standard SNR resonators, these being constrained in terms of dimensions by the sub-micrometric width (that is to say less than 1 μm) of their fluidic channel.

Generally speaking, the SMR resonator will be coupled mechanically to the NEMS sensor such that the driving of the suspended part of the NEMS sensor in oscillation by the suspended part of the SMR resonator is at a maximum, and so as to minimize vibration damping of both of them, so as thus to optimize the quality factor. The challenge is for the mechanical coupling to dampen the vibrations of the NEMS sensor, and in turn those of the SMR resonator, as little as possible, and therefore to obtain the most efficient possible transduction between the two coupled oscillators.

BRIEF DESCRIPTION OF THE FIGURES

Other features and advantages will become apparent in the following detailed description given with reference to the appended drawings, in which.

DETAILED DESCRIPTION OF AT LEAST ONE EMBODIMENT

Figure 1A:
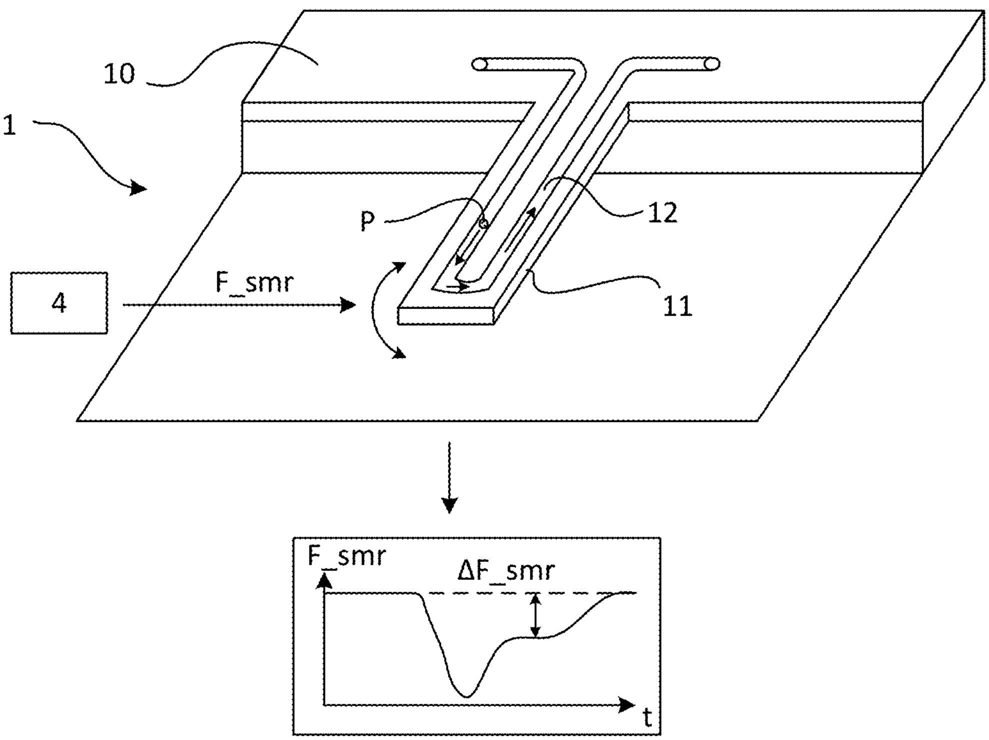
FIGS. 1A and 1B show an SMR mechanical resonator, respectively seen in perspective and seen from above.
Figure 1B:
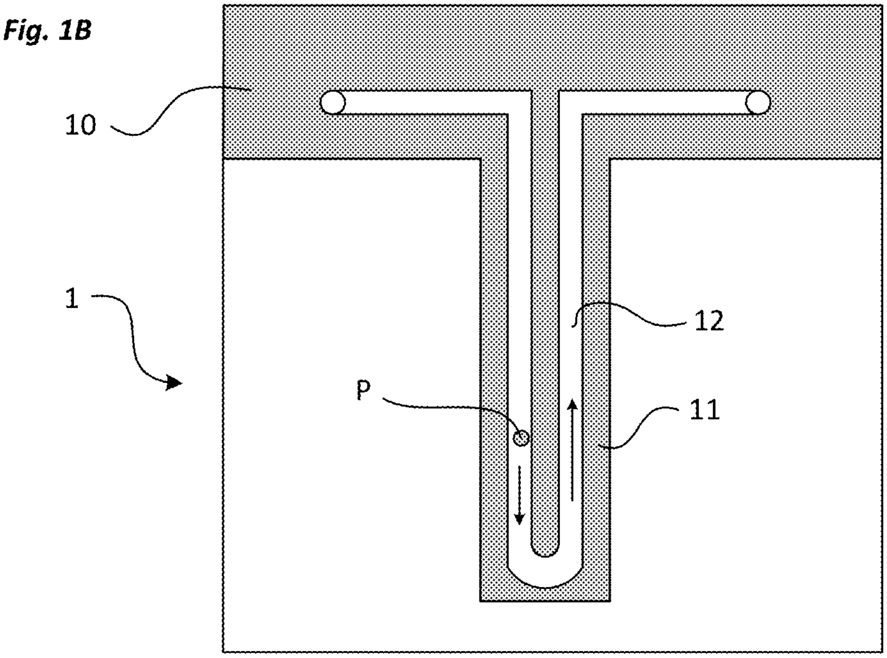

The invention relates to a system used to measure at least one property (for example mass, volume, density) of a particle. A particle is understood to mean for example a biological particle such as a cell, exosome, virus, bacterium, etc. A particle is also understood to mean an inorganic particle such as for example a gold particle, polystyrene particle, etc.

The system of the invention is based on the use of at least two entities that are coupled mechanically to one another.

SMR or SNR Mechanical Resonator

FIG. 1A

FIG. 1B

FIG. 2

A first entity of the system consists of a mechanical resonator 1, better known as an SMR (suspended microchannel resonator—also designated SMR resonator below) or an SNR (suspended nanochannel resonator), its micro or nano character depending in particular on the dimensions of its integrated fluidic channel. A resonator equipped with a fluidic channel the width or thickness of which is less than 1 μm will be referenced as an SNR, otherwise it will be an SMR.

Indeed, such an (SMR or SNR) mechanical resonator 1 comprises at least a fixed part 10, and a suspended part 11 connected to the fixed part 10 and capable of vibrating when it is excited. The suspended part 11 is conventionally in the form of a beam extending along what is referred to as a longitudinal axis.

It also comprises a fluidic circuit integrated into its suspended part, this fluidic circuit comprising at least one fluidic channel 12 hollowed out inside its suspended part 11, covered with sealed walls on the four faces (top, bottom, side) and intended to be used to inject therein a fluid in which one or more particles P to be characterized are situated.

Advantageously, the mechanical resonator 1 is an SMR (rather than an SNR), so as to be able to make larger particles P circulate therein, and to analyse complex samples (see below).

The system comprises excitation means 4 configured to make the suspended part 11 of the mechanical resonator 1 vibrate at an excitation frequency F_smr. This excitation frequency is advantageously the resonant frequency of the resonator or a frequency equivalent to a higher mode of this resonant frequency.

In this type of resonator, the vibration is generally produced out-of-plane (as indicated by the curved arrow in FIG. 1A), but it may alternatively be generated in-plane, or even torsionally. The in-plane or out-of-plane vibration is produced in a horizontal or vertical plane, respectively, when the longitudinal axis of the beam is positioned horizontally.

The suspended part 11 may be single-clamped, connected to a single fixed part and thus provided with a cantilevered free end. Reference will be made to a "cantilever" in this example.

The suspended part 11 may also be double-clamped, then joining two fixed parts.

The suspended part 11 may also be produced in the form of a plate supported by multiple anchoring points.

Regardless of its architecture, this suspended part is able to be set in vibration so as to oscillate at the excitation frequency F_smr, this frequency advantageously being the resonant frequency at its fundamental natural mode or one of its higher natural modes, or even a combination of these modes.

Figure 2:
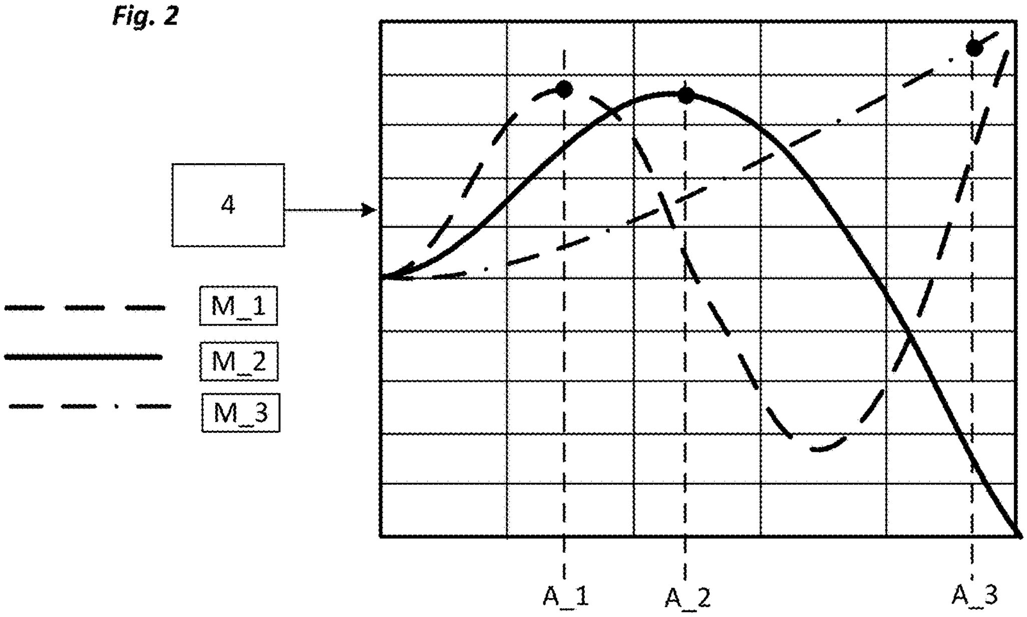
FIG. 2 shows examples of deformation curves of an SMR mechanical resonator in various vibration modes.

It will be recalled that such a mechanical resonator 1 may be excited in multiple vibration modes, designated for example M_1, M_2, M_3 in FIG. 2. In this example, an out-of-plane bending vibration is involved.

For each vibration mode, the resonator has vibration nodes and vibration anti-nodes.

It will be recalled that a vibration anti-node corresponds to a region of the suspended part where the vibration amplitude is at a maximum for the invoked vibration mode.

FIG. 2 indicates the presence of vibration anti-nodes A_1, A_2, A_3 for each of the three vibration modes.

By virtue of a pressure gradient imposed between the ports located upstream and downstream of the fluidic channel 12 integrated into the suspended part 11, it is possible to control the flow of the fluid (its flow rate and flow direction) in the fluidic channel 12, and therefore the passage of suspended particles P through the fluidic channel of the mechanical resonator 1. When a particle P circulates in the fluidic channel of the resonator, it transiently alters the mass (by Δm) of the suspended part 11 of the resonator 1, resulting in a shift in its (resonant) frequency that is proportional to the floating mass of the particle.

Indeed, the shift in the frequency ΔF_smr (FIG. 1A) of the resonator depends on the added mass Δm, on the total mass m of the resonator and on a correction coefficient α, which depends specifically on the position of the added particle P, according to the following relationship:

$$\frac{\Delta F\_smr}{F\_smr} = -\propto \frac{\Delta m}{m}$$

Thus, when a particle with a given floating mass Δm is injected into the fluidic channel 12 of the resonator, this results in a maximum vibration amplitude when this particle P is located at the vibration anti-node (for the vibration mode M_1 for example), and therefore a maximum frequency shift. It should be noted that, depending on the difference in density between the particle and the carrier fluid, the floating mass Δm will be positive (in the case of a denser particle) or negative (in the case of a less dense particle).

Gravimetric Sensor

FIG. 3A

FIG. 3B

The second entity of the system consists of a gravimetric sensor 2 (also designated NEMS sensor below). By way of example, this gravimetric sensor 2 is advantageously produced in the form of an NEMS (nanoelectromechanical system).

This type of gravimetric sensor is also based on a mechanical oscillator, which is set in vibration at a vibration frequency F_nems, and does not have a fluidic channel.

It thus comprises a fixed part 20 and a suspended part 21 connected to its fixed part and capable of vibrating with respect to the fixed part 20 when it is excited.

The suspended part 21 is conventionally also in the form of a beam extending along what is referred to as a longitudinal axis.

Unlike the mechanical resonator 1, which is responsible for making the particles P circulate in its fluidic channel 12, the gravimetric sensor 2 does not have a fluidic circuit. It is used only as a measuring means for measuring frequency fluctuations (see below).

The excitation means 4 of the system are configured to make the suspended part 21 of the gravimetric sensor 2 vibrate at the vibration frequency F_nems. It will be seen that the NEMS sensor may be set in vibration via the mechanical resonator 1 and the mechanical link between the two elements, without any external excitation means.

Figure 3A:
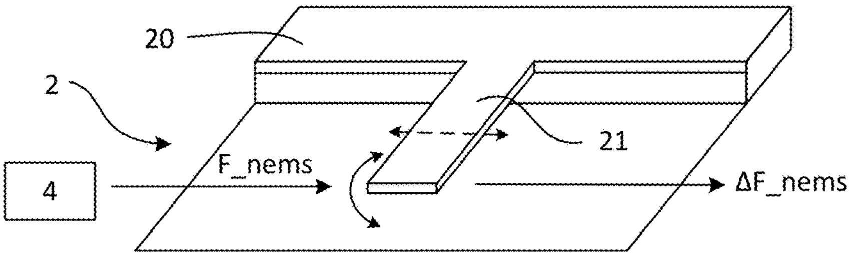
FIGS. 3A and 3B show an NEMS sensor, respectively seen in perspective and seen from above.
Figure 3B:
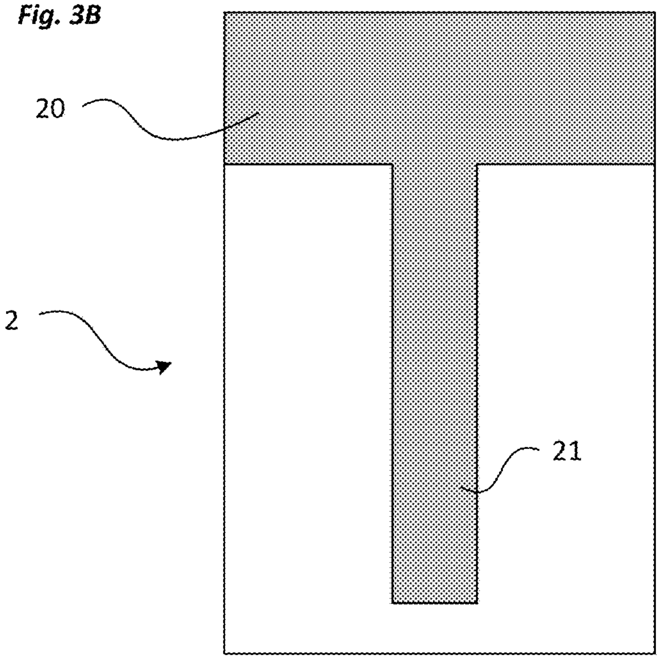

In this type of sensor, the vibration is generally produced out-of-plane (as indicated by the solid arrow in FIG. 3A) or, alternatively, in-plane (as indicated by the dotted arrow in FIG. 3A). One vibration variant may be implemented in a torsional mode. The in-plane or out-of-plane vibration is produced in a horizontal or vertical plane, respectively, when the longitudinal axis of the beam is positioned horizontally.

The vibration frequency F_nems is for example equal to a value that may range from −30% to +30% of the value of the excitation frequency F_smr of the mechanical resonator, advantageously its resonant frequency or that of its higher natural mode.

This vibration frequency F_nems is advantageously chosen to be close to the resonant frequency F_smr of the mechanical resonator 1 or that of its higher natural mode in order to harmonize the vibration of the two suspended entities.

Mechanical Coupling

FIG. 2

FIG. 4A

FIG. 4B

The principle of the invention is based on mechanical coupling between a mechanical resonator 1 as described above and a gravimetric sensor 2 as described above.

The mechanical coupling is achieved by integrating a mechanical linking element 3 between the suspended part 11 of the mechanical resonator and the suspended part 21 of the gravimetric sensor. This mechanical linking element 3 is for example a single beam forming the junction between the two suspended parts. It may in particular be one or more nanobeams obtained in line with the fabrication process employed.

The mechanical resonator 1 is thus used to convey the particles P in circulation through its fluidic channel 12. It is set in vibration at its excitation frequency F_smr (advantageously its resonant frequency or a higher natural mode thereof). The gravimetric sensor 2 is also excited at the vibration frequency F_nems, advantageously close to the excitation frequency of the mechanical resonator, and is used to measure frequency fluctuations at the resonator 1 when the latter receives a particle in its fluidic channel 12.

The mechanical coupling of the mechanical resonator 1 (advantageously an SMR) to the gravimetric sensor 2 (advantageously an NEMS) and the reading of the frequency fluctuations at the gravimetric sensor 2 make it possible to:

- Cover a wider range of particles P than when using a mechanical resonator on its own (for example an SNR), in particular in terms of the size of objects to be weighed; the fluidic channel 12 integrated into the SMR resonator is widened (for example 20×20 $\mu m^2$ for an SMR resonator versus 0.7×0.7 $\mu m^2$ for an SNR resonator, that is to say a gain of around 816 in terms of surface area ratio). The consequence of this increase in fluidic cross section is the decrease in fluidic resistance, and therefore the increase in the flow rate with an identical pressure gradient.
- Reduce risks of clogging inherent to nanofluidic channels of SNR resonators,
- Offer a mass detection limit comparable to that of SNR resonators (detection limit of the order of attograms at present) by virtue of the reading of frequency fluctuations at the NEMS gravimetric sensor coupled mechanically to the SMR resonator.

The beam (or suspended part) 12 of the mechanical resonator 1 is capable of being excited in multiple vibration modes (for example M_1, M_2, M_3), each of these modes being expressed by a deformation of the beam 12 that locally has vibration nodes and anti-nodes at various locations predetermined by the laws of structural mechanics and dynamics. It will be recalled that a vibration anti-node A_1, A_2, A_3 corresponds to a region where the vibration amplitude is at a maximum.

The mechanical coupling of the NEMS sensor 2 to the SMR resonator is advantageously designed to maximize the transmission of vibration waves between the two oscillators, and to limit as far as possible the oscillation damping of both of them, the damping being generated by this coupling.

Figure 4A:
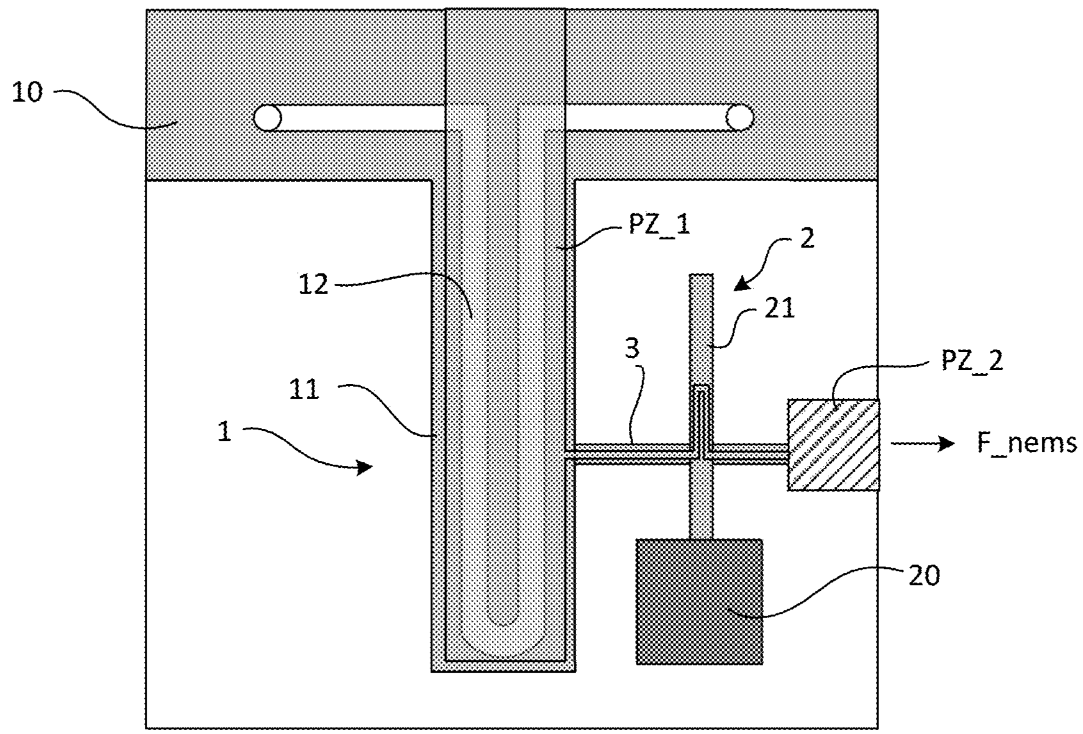
FIGS. 4A and 4B show one particular embodiment of the measuring system of the invention and illustrate its operating principle.
Figure 4B:
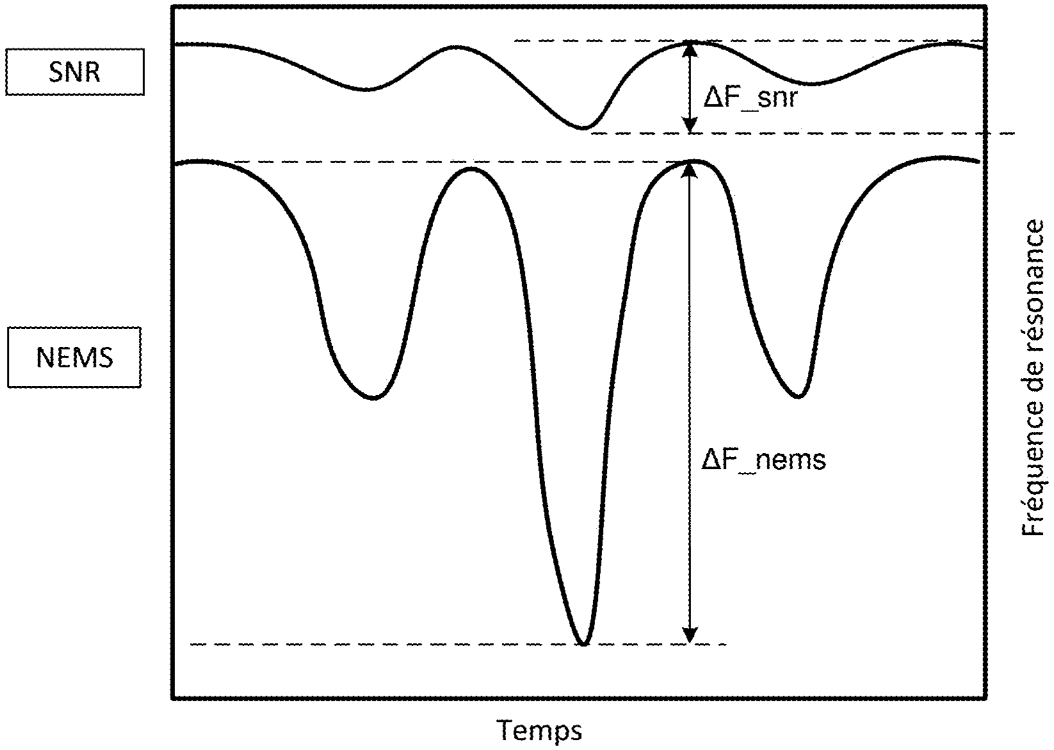

It is important for any fluctuation ΔF_smr in the excitation frequency of the SMR resonator 1 to be expressed by a frequency variation ΔF_nems at the NEMS sensor 2 (FIG. 4B). One example consists in positioning the mechanical link at a vibration anti-node of the SMR resonator 1 on the vibration mode for which the latter is actuated in order to maximize the transduction between the latter and the NEMS sensor.

Excitation Means

FIG. 4A

It should be noted that multiple transduction/excitation modes are conceivable for:

- Actuating the SMR resonator and the NEMS gravimetric sensor at the chosen frequency (for example resonant frequency for the SMR and vibration frequency for the NEMS), and
- Enabling measurement of the frequency and its fluctuations at the NEMS gravimetric sensor.

The NEMS sensor is able to be set in vibration solely and directly via the mechanical link that exists between the suspended part 11 of the mechanical resonator 1 and the suspended part 21 of the NEMS sensor. This may also be achieved by controlling the excitation means 4, which are configured to excite both (see the advantageous combination below) the suspended part 11 of the mechanical resonator 1 at the excitation frequency (for example fundamental resonant frequency or a higher natural mode thereof) and the suspended part 21 of the NEMS sensor at the desired vibration frequency.

Preferably, one advantageous combination is based on:

- Actuation/excitation based on a piezoelectric effect (for example by bringing a piezoceramic into contact with the rear face of the component) in order to simultaneously actuate the SMR resonator and the NEMS sensor. The piezoceramic is bonded to a printed circuit board, which is itself designed to apply thereto an electric potential that will deform the piezoelectric material. Said piezoelectric material is set in vibration by applying thereto for example an electrical signal at the resonant frequency of the SMR or NEMS sensor, or a signal comprising the various frequency signals corresponding to the modes of the oscillators present on the chip. The advantage of this configuration lies in the fact that the applied signal is able to collectively actuate the various oscillators present on the component (NEMS and SMR) and the various resonance modes desired for each of them. This is therefore a very suitable approach for an oscillator array.
- Reading based on a piezoresistive effect, by implanting for example the NEMS layer with dopants and a suitable concentration, either locally to define there a gauge at the clamping of the NEMS sensor or over the full surface by exploiting the structuring of suspended nano-strain gauges connecting for example the NEMS sensor either to the SMR resonator or to fixed pads.

Actuation through capacitive coupling is also a possible solution. In this case, it is necessary to integrate an electrode as close as possible to the NEMS sensor 2 and the SMR resonator 1 if the latter also needs this actuation source. This transduction mode is well suited for lateral vibration modes but requires the oscillating suspended part and the actuation electrode located opposite to be conductive enough for a transduction capability to be available.

FIG. 4A shows the region where a piezoresistor PZ_1 is located (via doping—for example boron doping) at the suspended part 11 of the SMR resonator 1 and the suspended part 21 of the NEMS sensor, this region terminating through the presence of a piezoresistive gauge PZ_2 extending from the linking element 3 between the SMR resonator and the NEMS sensor. This solution makes it possible to determine the frequency variations at the NEMS sensor 2, since the current variations in the piezoresistor will be at a maximum at the resonance frequency of the NEMS sensor.

Variant Embodiments of the System

FIGS. 4A to 11

Proceeding from these principles, the mechanical link between the beam of the SMR resonator and that of the NEMS sensor may be produced according to various configurations. It should also be noted that it is possible to mechanically couple a single SMR resonator to multiple NEMS sensors (for example two NEMS sensors). The measuring means (for example via piezoresistivity—PZ_1+PZ_2) are not shown in FIGS. 5 to 11, but it should be considered that they are of course present.

It should be noted that, in all configurations, the two suspended parts 11, 21 extend, along their longitudinal axis, in parallel with one another and the linking element 3 extends, along its longitudinal axis, perpendicular to the two suspended parts, and thus creates a junction between the two suspended parts.

FIGS. 4A to 11 illustrate several conceivable configurations. These should be considered in a non-limiting manner. In each configuration, on the NEMS sensor 2 side, the mechanical linking element 3 is fixed at a vibration anti-node for one of its vibration modes. And on the SMR resonator 1 side, the mechanical linking element 3 is fixed in a region of its suspended part that corresponds to an anti-node for one or more vibration modes. It should be noted that the beam forming the mechanical linking element may be formed of multiple nano-beams.

FIG. 4A—One SMR resonator+one NEMS sensor: A single-clamped beam 11 of the SMR resonator 1 is coupled mechanically to the beam 21 of an NEMS sensor by a lateral mechanical link. In this example, the mechanical linking element 3, formed by a coupling beam, is located at the first anti-node of the beam 11 of the SMR resonator from its clamping, for its second out-of-plane bending vibration mode.

Figure 5:
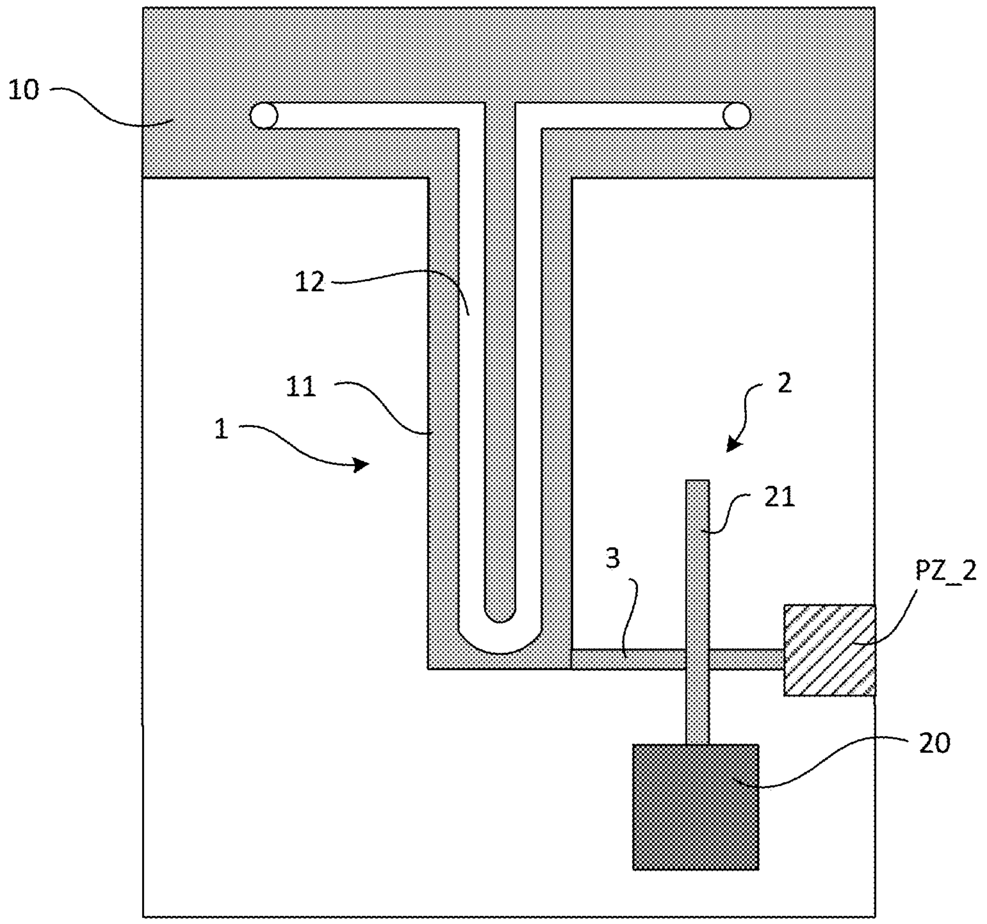
FIGS. 5 to 11 show several variant embodiments of the measuring system of the invention.

FIG. 5—One SMR resonator+one NEMS sensor: A single-clamped beam 11 of the SMR resonator 1 is coupled mechanically to the beam 21 of an NEMS sensor by a lateral mechanical link. In this example, the mechanical linking element 3, formed by a coupling beam, is located at the free end of the beam 11, that is to say at an anti-node for its first, second and third out-of-plane bending vibration mode.

Figure 6:
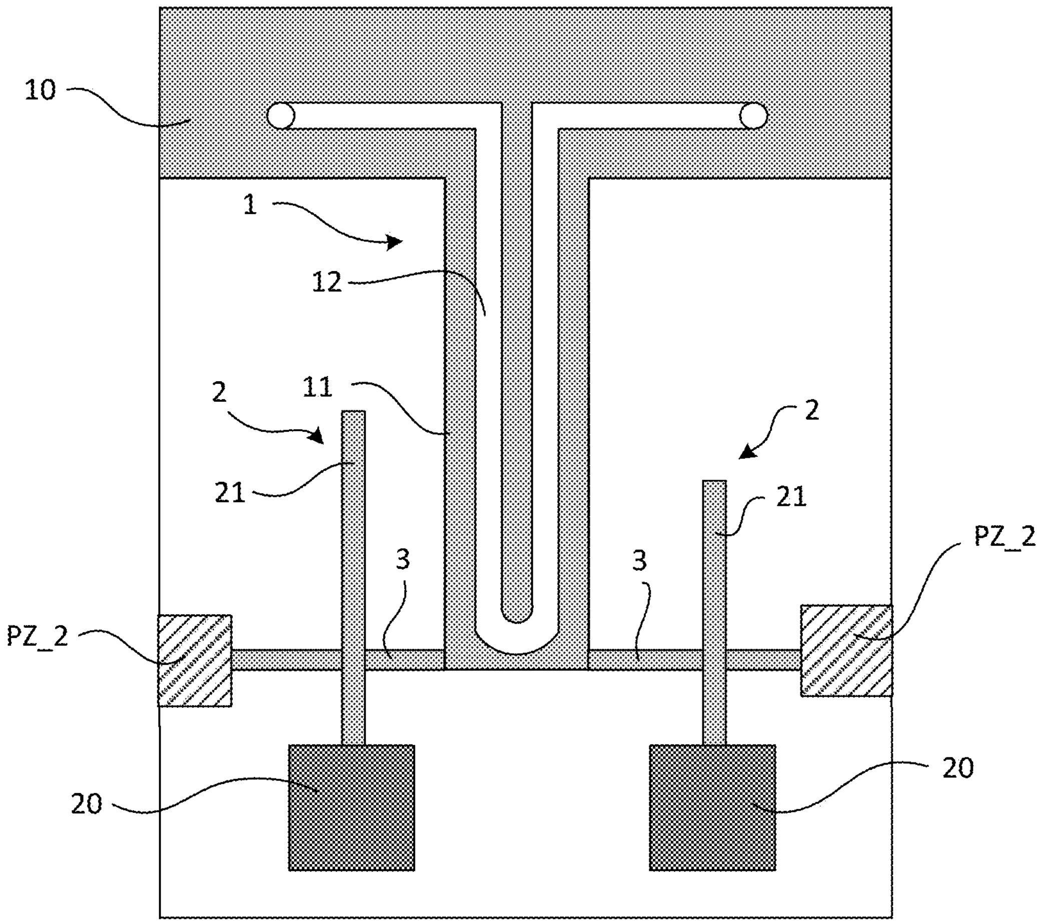

FIG. 6: One SMR resonator+one or two NEMS sensors: A single-clamped beam of the SMR resonator is coupled mechanically to the beam of one NEMS sensor or each of the two NEMS sensors by a lateral mechanical link located at its free end, that is to say at an anti-node for its first, second and third out-of-plane bending vibration mode. The same references are kept for both NEMS sensors.

Figure 7:
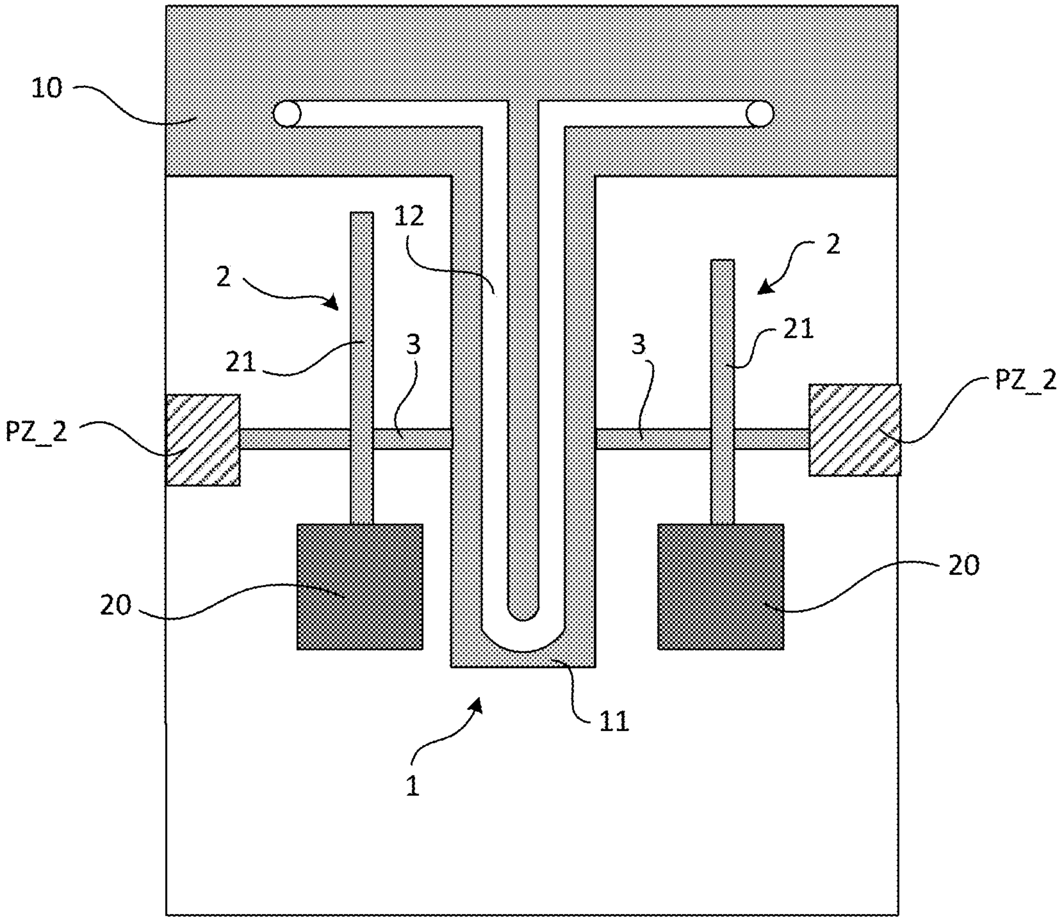

FIG. 7: One SMR resonator+one or two NEMS sensors: A single-clamped beam of the SMR resonator is coupled mechanically to the beam 21 of one NEMS sensor or each of the two NEMS sensors by a lateral mechanical link located at the first anti-node of the beam of the SMR resonator from its clamping for its second out-of-plane bending vibration mode.

Figure 8:
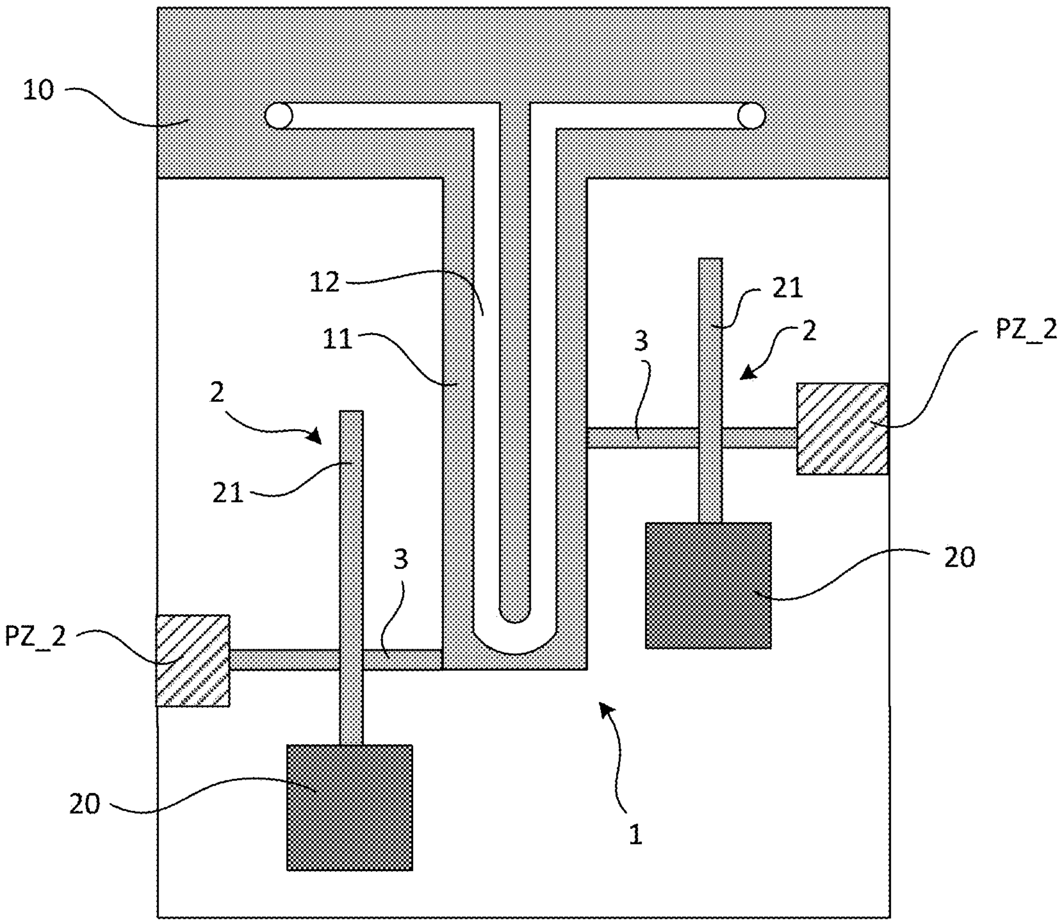

FIG. 8: One SMR resonator+two NEMS sensors: A single-clamped beam of the SMR resonator is coupled mechanically to the beam of each of the two NEMS sensors by a first lateral mechanical link located at its free end, and by a second mechanical link at its first anti-node of the SMR beam from its clamping for its second out-of-plane bending vibration mode.

Figure 9:
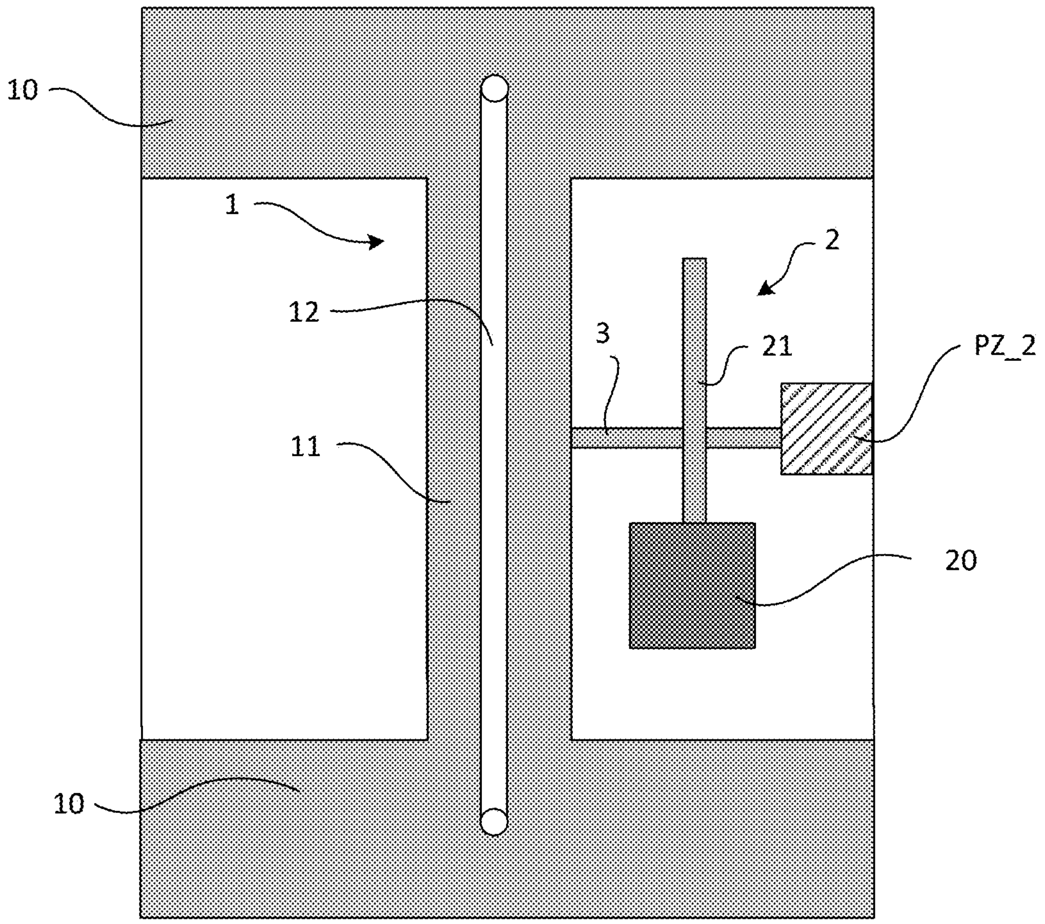

FIG. 9: SMR resonator+one NEMS sensor: The beam of the SMR resonator is double-clamped (between two fixed parts 10) and coupled mechanically to an NEMS sensor by a lateral mechanical link located on an anti-node for its first out-of-plane (or also in-plane) bending vibration mode.

Figure 10:
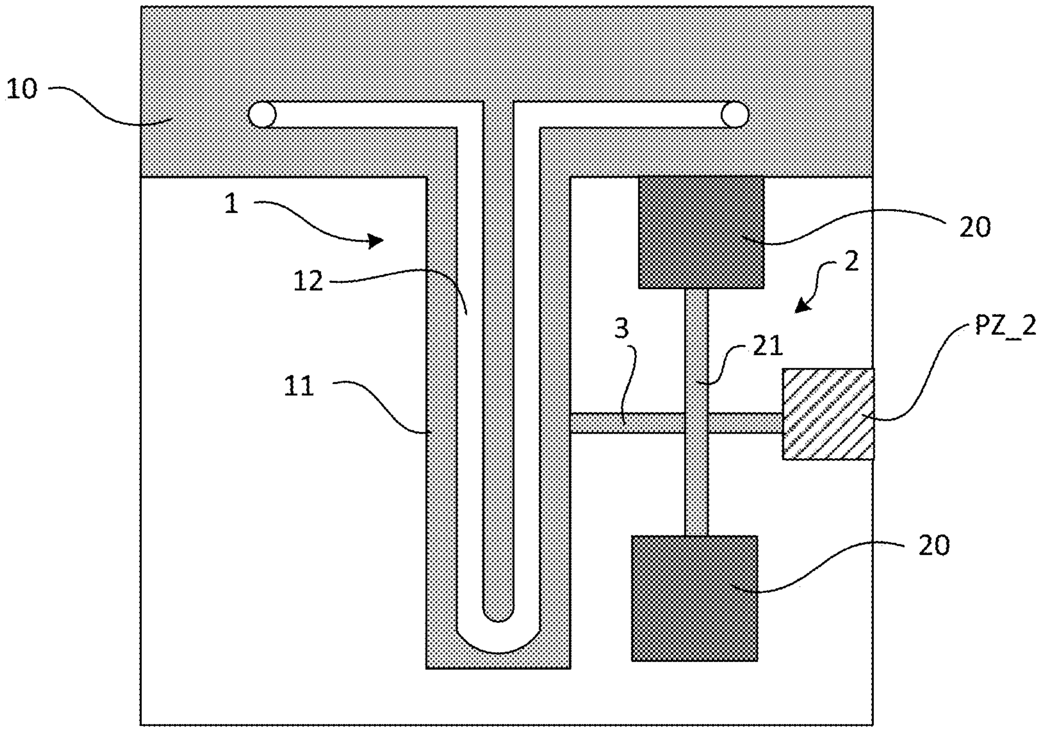

FIG. 10—One SMR resonator+one NEMS sensor: A single-clamped beam 11 of the SMR resonator 1 is coupled mechanically to the beam 21 of an NEMS sensor by a lateral mechanical link. In this example, the mechanical linking element 3, formed by a single coupling beam, is located at the first anti-node of the beam of the SMR resonator from its clamping for its second out-of-plane bending vibration mode. In addition, the NEMS sensor is produced in the form of a double-clamped beam (between two fixed parts 20). The linking element 3 is connected to this beam on an anti-node of the NEMS sensor for its first out-of-plane (or also in-plane) bending vibration mode.

Figure 11:
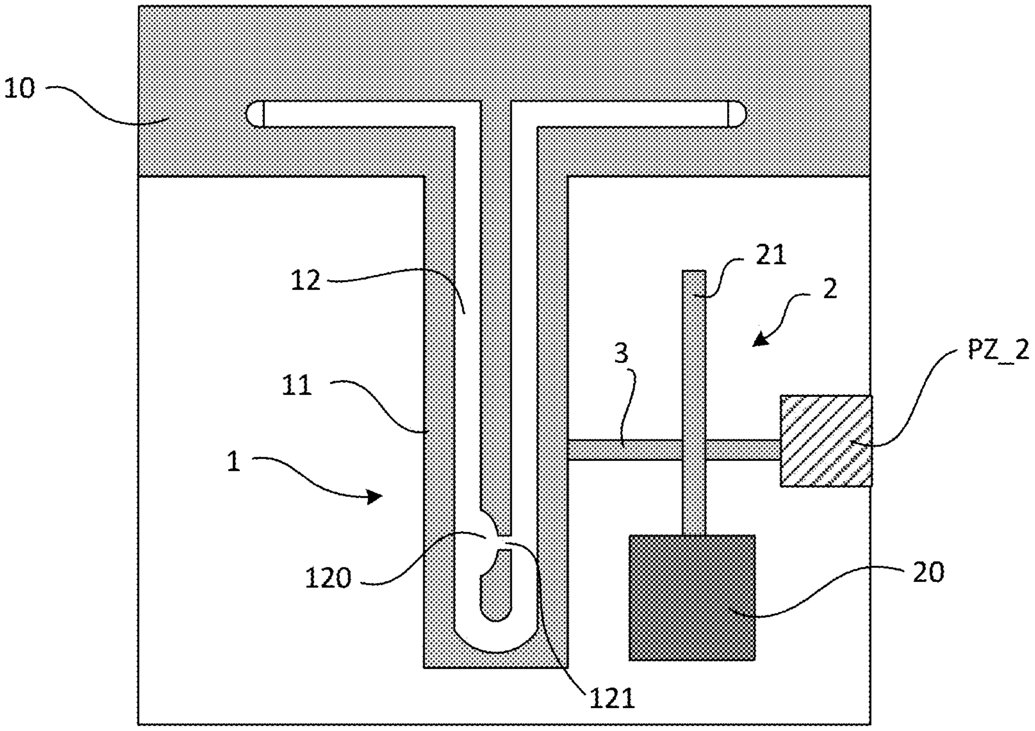

FIG. 11—One SMR resonator+one NEMS sensor: The fluidic circuit of the SMR resonator here has one or more trapping regions, each dedicated to receiving a particle. It is thereby possible to trap one or more particles (for example cells) in the fluidic circuit and to monitor, in particular, with the precision of the NEMS sensor 2 coupled thereto, various parameters such as the mass growth rate of the particle when it is exposed to a drug (to evaluate the effectiveness thereof), the growth of the particle in a medium or the secretion of viral particles or exosomes. Instead of a cell, it is possible to trap one (or more) functionalized beads (coated with antibodies or aptamers) and monitor the grafting kinetics with targets such as proteins. The hydrodynamic trap is produced in the form of a bypass branch with respect to the fluidic channel 12 of the SMR resonator 1 and comprises a receptacle 120 dimensioned so as to receive the particle P and a restriction 121 extending said receptacle.

A combination of the features of the various embodiments described above is also conceivable.

Particular Embodiment

Without limitation, the SMR resonator 1 and the NEMS sensor 2 are chosen so as to have a cantilevered beam ("cantilever"—a suspended part connected to a single fixed part). The length and the thickness of the NEMS sensor 2 are chosen such that its fundamental frequency in the first vertical bending mode coincides with the resonant frequency for the second vertical bending mode of the SMR resonator.

The table below gives one example of dimensioning:

| | Length and width (μm) | Width and depth (μm) of integrated channel | Width of inside wall and outside walls | Total thickness (μm) | F0/F2nd mode (out-of-plane) |
|---|---|---|---|---|---|
| SMR | 200/33 | 8/3 | 5/6 | 3.4232 | 116.12 kHz<br>727.7656 kHz |
| NEMS | 19.5/0.5 | | | 0.2 | 725.67 kHz/4.548 MHZ |

By way of example, the SMR resonator 1 has a single-clamped beam 11, a channel that is 3 μm deep and 8 μm wide, a central wall that is 5 μm wide, and external walls that are 6 μm wide, that is to say a total width of 33 μm.

The beam 11 of the SMR resonator has a length of 200 μm, and the thickness of the lower and upper membranes covering the buried channel is 200 nm. Taking into account the bonding interface oxide layer for sealing the top cover, it is estimated that the total thickness of the SMR resonator is 3.4232 μm. This set of dimensional parameters leads to an estimated theoretical resonant frequency of around 116.12 kHz for its out-of-plane bending fundamental mode, and 727.766 kHz for its second bending mode. Assuming an Allan variance of the order of ppm ($10^{-6}$), a mass detection limit of 14.4 fg is estimated.

Considering a beam 21 of an NEMS sensor 2 that is coupled mechanically to the SMR resonator, the coupling is achieved for example by way of one or more suspended nano-beams 3 located perpendicular to the longitudinal axis of the beam of the SMR resonator, at the first anti-node of the second bending mode of the SMR resonator from its clamping (FIG. 4A).

It will be assumed, for example, that the NEMS sensor and its nano-beams have a thickness equivalent to that of the top cover covering the fluidic channel of the SMR resonator. The width and the length of the beam 21 of the NEMS sensor 2 are dimensioned such that its resonant frequency in its out-of-plane fundamental natural mode has a value similar to if not close to the frequency of the second bending mode of the SMR resonator.

For the dimensioning of the NEMS sensor 2, in relation to the working frequency of the SMR, the following analytical formula derived by applying the Euler-Bernoulli beam theory is used:

$$f_n = \frac{\lambda_n^2}{2\pi}\sqrt{\frac{EI}{\rho S}}$$

where E denotes the Young's modulus, S corresponds to the cross section of the NEMS beam in oscillation, I is its moment of inertia in the direction of the vibrations, $\lambda_n$ is a natural value determined according to the order of the mode, its type (bending, torsional, etc.) and the conditions at the limits of the beam obtained by solving the differential equation of the motion of the beam, recalled below, in the absence of damping and external forces actuating it:

$$EI\frac{\partial^4 y(x,t)}{\partial^4 x} + \rho S\frac{\partial^2 y(x,t)}{\partial^2 t} = 0$$

If considering bending in an out-of-plane direction:

$$f_n = \frac{\lambda_n^2 t}{4\pi}\sqrt{\frac{E}{3\rho}}$$

With:

$$I = \frac{wt^3}{12}$$

and w and t denote the width and the thickness of the beam of the NEMS sensor, respectively.

The following table lists the values of $\lambda_n$ for single-clamped and double-clamped beams:

| | $\Lambda_1$ | $\Lambda_2$ | $\Lambda_3$ | $\Lambda_4$ |
|---|---|---|---|---|
| Single clamping | 1.875 | 4.694 | 7.854 | 10.995 |
| Double clamping | 4.73 | 7.853 | 10.995 | 14.14 |

Given the equation, it is possible to deduce the expression of the resonant fundamental mode of a double-clamped NEMS beam given by the following formula:

Therefore:

$$f_1 = \frac{t}{L^2}\frac{4{,}73^2}{4\pi}\sqrt{\frac{E}{3\rho}}$$

$$L = 4{,}73\sqrt{\frac{t}{4\pi f_1}}\sqrt{\frac{E}{3\rho}}$$

And, for a single-clamped beam, this gives:

$$L = 1{,}875\sqrt{\frac{t}{4\pi f_1}}\sqrt{\frac{E}{3\rho}}$$

For a thickness of 200 nm of the beam 21 of the NEMS sensor 2, if considering for example a length of 19.5 μm and a width of 0.5 μm, a fundamental natural frequency value of 725.67 kHz is estimated, that is to say an error of 0.2% with respect to the estimated value of the second out-of-plane bending resonance mode of the SMR resonator. If at present the length of the beam of the NEMS sensor is 19.48 μm, then a fundamental natural frequency value of 727.161 kHz is estimated, that is to say an error reduced to 0.08% with respect to the estimated value of the second mode of the SMR resonator 1. On the other hand, controlling the length of the beam 21 of the NEMS sensor 2 with a dimensional resolution of the order of 10 nm appears to be incompatible at present with the precision of nano-fabrication processes combining lithography and nano-etching. An Allan variance of the order of ppm (10-6) is assumed for the NEMS sensor.

For its out-of-plane bending fundamental mode, a mass detection limit of the NEMS sensor of 2.14 ag is estimated, that is to say a gain of 6728 compared to the detection limit of the SMR resonator.

As expected, the reduction in size of the NEMS sensor 2 is therefore favourable for improving (here by three orders of magnitude) the mass detection limit compared to the SMR resonator 1 on its own.

Applications

A few examples of possible applications of the system of the invention are listed below, taking advantage of the versatility offered by the increased cross section of the fluidic channel 12 of the SMR resonator 1 compared to its nanometric version (SNR), combined with the mass measurement sensitivity of the NEMS sensor 2.

- Weighing polydisperse samples, containing particles (whether inorganic, biological, synthetic or a mixture of these various objects) with size scales ranging from a few nanometres to a few micrometres (given the cross section of the fluidic channel of the SMR resonator, which is approximately 20×20 μm²).

- Weighing heterogeneous complex biological samples, for example blood, or other biofluids, in which for example cells (red blood cells, lymphocytes, circulating tumour cells), circulating DNA, circulating RNA, proteins, cellular debris, extracellular vesicles (EVs), exosomes, potentially viruses or even bacteria coexist. This set has size ranges ranging from nm to several μm, and floating masses ranging from 0.1 attograms to several picograms.
- Isolating a biological cell in the fluidic channel of the SMR resonator by trapping it in a hydrodynamic trap (see variant in FIG. 11). Given the mass resolution of the NEMS sensor 2, it would be possible to measure, with an accuracy of the order of an attogram, the rate of increase or loss of mass of the cell following either its growth or cell death, or even its reaction, in the broad sense, to exposure of a molecule (drugs). Another feature of this "in-situ" trapping, combined with the mass resolution of the NEMS sensor, concerns the dynamic monitoring of cellular transfection by targets such as viral nanoparticles (adenoviruses for example) or, conversely, the production and secretion of viral nanoparticles or else extracellular vesicles (EVs), objects characterized by a floating mass ranging from a few attograms to a few hundred attograms. This capability of real-time monitoring of secretions may also be implemented by trapping the cell upstream of the fluidic channel integrated into the SMR resonator, thereby making it possible to clearly monitor the production kinetics of secretions flowing in the fluidic channel of the SMR resonator, without possible bias with the mass increase rate intrinsic to the cell.
- Another example relates to highlighting target biomarkers by weighing, either by grafting to the previously functionalized surface of the fluidic channel integrated into the SMR resonator, or else by grafting onto one or more beads trapped in the SMR resonator by way of hydrodynamic traps. Again, the advantage of this invention over SNR technology lies in the fact that the trapped bead may be much wider, with a diameter of several micrometres, its developed surface making it possible to accommodate a much larger number of probes than would be possible with a sub-micrometric bead trapped in an SNR.

Operation

A system according to the particular embodiment described above is considered, this system comprising:

- An SMR mechanical resonator 1;
- An NEMS gravimetric sensor 2;
- A linking element 3 mechanically coupling the suspended part of the SMR resonator to the NEMS gravimetric sensor.

To calibrate the mass sensitivity of the NEMS sensor 2 with respect to the mass variations following the passage of particles through the SMR resonator, a monodisperse population of reference nanoparticles (that is to say with a density and size known a priori), such as gold nanoparticles, is made to circulate in the fluidic channel of the SMR resonator. The passage of each nanoparticle through the fluidic channel 12 of the SMR resonator 1 results in a transient modification of its effective mass $m_{eff}$, and therefore a frequency shift that is propagated to the suspended part 21 of the NEMS sensor 2 that is coupled mechanically thereto. The frequency shift ΔF_nems measured by the NEMS sensor 2 should a priori be at a maximum when the particle is positioned at a location in the fluidic channel of the SMR resonator where the mechanical coupling between the SMR resonator and the NEMS sensor is optimum.

In the invention, as indicated above, this is a position in which the nanoparticle is located on a vibration maximum (anti-node) of the SMR resonator 1.

By measuring the frequency shift ΔF_nems measured with the aid of the NEMS sensor 2, a sensitivity expressed in grams per Hertz is deduced therefrom. Once this sensitivity has been calibrated, it is then possible to inject a sample into the SMR resonator 1 and to deduce the mass of the particles circulating therein, without knowing their density beforehand.

The advantage of this invention lies in the fact that the dynamic size range of the particles and targets circulating in the fluidic channel 12 of the SMR resonator 1 is extended (compared to SNR-only technologies).

The mechanical coupling of the NEMS sensor 2 to the SMR resonator 1 is advantageously designed such that the mechanical link is effected at a vibration anti-node of the SMR resonator 1 on the vibration mode for which it is actuated in order to maximize the transduction between it and the NEMS sensor.

The particles P of interest are conveyed into the fluidic channel 12 of the SMR mechanical resonator 1. Their circulation in the SMR resonator 1 results in a transient shift ΔF_smr in the resonant frequency of the SMR resonator 1, as is the case for conventional SMR resonators (taken on their own, that is to say without mechanical coupling).

On the other hand, according to the invention, this frequency variation is read by monitoring the frequency of the NEMS sensor 2 that is coupled mechanically to the SMR resonator. Since the NEMS sensor has a suspended part 21 having an effective mass (fraction of the total mass of the NEMS, and which depends on the invoked vibration mode) that is reduced compared to the effective mass of the suspended part 11 of the SMR resonator, its detection limit is theoretically much lower, even with a frequency stability of the order of ppm. It is therefore easier to read the frequency variation ΔF_nems at the NEMS sensor 2.

Fabrication

FIG. 12

The system of the invention may be fabricated using techniques already used to fabricate SMR and SNR solutions.

Figure 12:
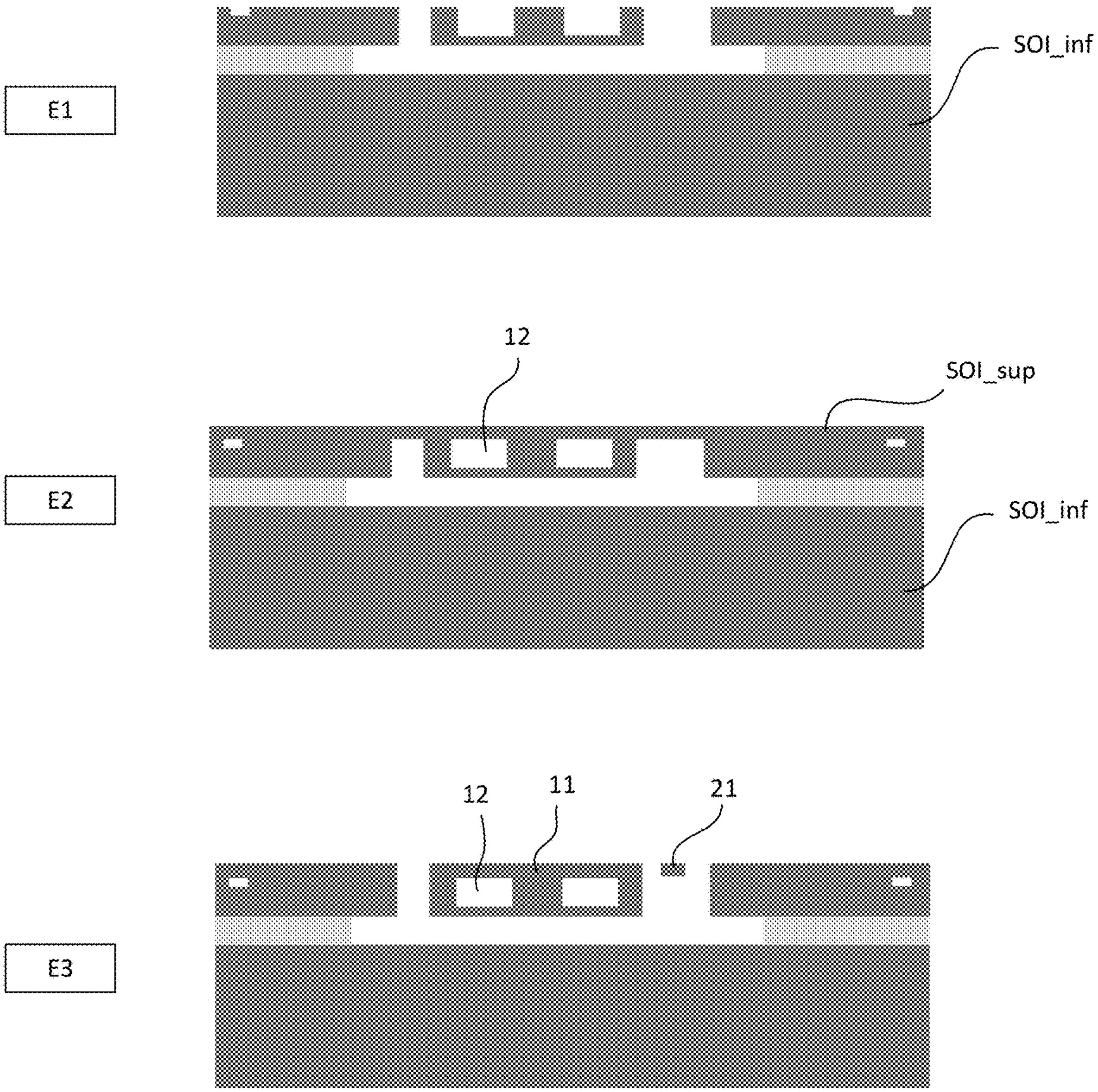
FIG. 12 shows the steps of one example of a process for fabricating the measuring system of the invention.

It may involve for example using two SOI ("silicon on insulator") substrates bonded to one other (front face to front face) by molecular sealing, in the following arrangement:

- A lower SOI substrate (denoted SOI_inf in FIG. 12) whose active silicon layer (thickness typically of the order of 20 μm for an SMR) is partially etched so as to define therein the shape of the fluidic channel that is integrated into the SMR resonator,
- An upper SOI substrate (denoted SOI_sup in FIG. 12) whose active silicon layer is sealed by direct molecular sealing to the upper face of the lower SOI substrate.

The main fabrication steps are for example as follows:

E1: Etching the fluidic channel 12 into the lower SOI substrate as is commonly carried out for SMR or SNR technology;

Lithography and dry etching in order to etch the active silicon layer of the lower SOI substrate over its entire thickness. This step makes it possible to define one or more holes/cavities adjacent to the footprint of the fluidic channel in the SMR resonator. Chemical etching of the buried oxide layer (BOX=buried oxide) exposed through these holes. This chemical etching leads in particular to the suspension of what will constitute the suspended part 11 of the SMR resonator 1 or a fraction of its surface. It should be specified that at least one or more holes are positioned in line with the future suspended part of the NEMS sensor 2 and its nano-beams for connection to the SMR resonator, which nano-beams will be etched later.

E2: Once the holes or cavities have been produced, molecular sealing is then carried out on the front face of this stack with the upper SOI substrate, the thickness of the active layer of which corresponds to the thickness of the future NEMS sensor 2 and its nano-beams (=linking element 3).

Thinning the upper SOI substrate. The residual active layer of the upper SOI substrate is therefore used to seal the fluidic channel integrated into the future SMR resonator, and is also used as structural material in which the shape of the NEMS sensor 2 will subsequently be defined, along with its elements for mechanical connection to the SMR resonator and any nano-strain gauges for a piezoresistive measurement.

E3: Etching the contour of the suspended part 11 of the SMR resonator 1, of the suspended part 21 of the NEMS sensor, its one or more elements for mechanical coupling to the SMR, and any other patterns needed to implement the component.

Other steps are then implemented to finalize the fabrication of the system, in particular sealing a glass fluidic cover, structuring to define cavities needed for operation.

Other fabrication techniques could of course be employed.

The invention thus has numerous advantages, including:

- It exploits the small dimensions of the NEMS gravimetric sensor and takes advantage of its low effective mass, and therefore of its improved detection limit compared to that of the SMR mechanical resonator.
- By coupling the NEMS gravimetric sensor to the SMR mechanical resonator, the advantage of the latter is used to inject more complex samples therein than if these were injected into an SNR resonator (taken on its own) with much smaller channel dimensions.

The invention claimed is:

1. A system for measuring at least one property of a particle (P), comprising:

- a mechanical resonator comprising at least a first fixed part and a first suspended part able to vibrate with respect to the first fixed part, and a fluidic circuit integrated into its suspended part, in which a fluid containing said particle (P) is made to circulate,
- excitation means configured to make the first suspended part vibrate at an excitation frequency (F_smr),
- a first gravimetric sensor comprising at least a second fixed part and a second suspended part able to vibrate with respect to the second fixed part at a vibration frequency (F_nems),
- the first suspended part of the mechanical resonator and the second suspended part of the first gravimetric sensor being coupled mechanically to one another via a mechanical linking element,
- measuring means for measuring variations in the vibration frequency of the second suspended part of the first gravimetric sensor.

2. The system according to claim 1, wherein the excitation frequency corresponds to the resonant frequency of the resonator or that of a higher natural mode of this resonant frequency.

3. The system according to claim 2, wherein the mechanical linking element comprises a first end integral with the first suspended part on a first point corresponding to a vibration anti-node of the first suspended part, when the latter is excited at its resonant frequency (F_smr) or at that of a higher natural mode.

4. The system according to claim 3, wherein the mechanical linking element comprises a second end integral with the second suspended part on a second point corresponding to a vibration anti-node of the second suspended part, when the latter is excited at the vibration frequency (F_nems).

5. The system according to claim 1, wherein the first suspended part is chosen from among a beam clamped to a single fixed part, a beam clamped between two fixed parts, and a plate held between multiple fixed parts.

6. The system according to claim 1, wherein the second suspended part is chosen from among a beam clamped to a single fixed part, a beam clamped between two fixed parts, and a plate held between multiple fixed parts.

7. The system according to claim 1, wherein said excitation means are configured to make the second suspended part vibrate at a vibration frequency close to the resonant frequency of the first suspended part or that of a higher natural mode, at plus or minus 30% of said resonant frequency or that of the higher natural mode.

8. The system according to claim 1, wherein the excitation means comprise at least one piezoceramic element.

9. The system according to claim 1, wherein the measuring means comprise one or more piezoresistive gauges (PZ_2).

10. The system according to claim 1, wherein the fluidic circuit integrated into the first suspended part of the mechanical resonator comprises a main fluidic channel and a hydrodynamic trap positioned in its channel and intended to trap said particle.

11. The system according to claim 1, comprising:

- a second gravimetric sensor, comprising at least a third fixed part and a third suspended part able to vibrate with respect to the third fixed part at a second vibration frequency,
- the first suspended part of the mechanical resonator and the third suspended part of the second gravimetric sensor being coupled mechanically to one another via a second mechanical linking element,
- second measuring means for measuring variations in the second vibration frequency of the third suspended part of the second gravimetric sensor.

12. The system according to claim 11, wherein the third suspended part is chosen from among a beam clamped to a single fixed part, a beam clamped between two fixed parts, and a plate held between multiple fixed parts.

13. A method for measuring at least one property of a particle, implemented using a measuring system as defined in claim 1, wherein the method comprises the following steps:

- injecting a fluid containing said particle (P) into the fluidic circuit of the mechanical resonator,
- exciting the first suspended part of the mechanical resonator at its resonant frequency,
- exciting the second suspended part of the first gravimetric sensor at the vibration frequency,
- measuring variations in the vibration frequency of the second suspended part of the first gravimetric sensor.

14. A measuring method according to claim 13, wherein the method comprises a step of calibrating the system by injecting a fluid containing one or more calibrated particles into the fluidic circuit.

* * * * *